(12) United States Patent
Meylan et al.

(10) Patent No.: US 8,619,752 B2
(45) Date of Patent: Dec. 31, 2013

(54) METHOD AND APPARATUS FOR POLLING IN A WIRELESS COMMUNICATION SYSTEM

(75) Inventors: Arnaud Meylan, San Diego, CA (US); Sai Yiu Duncan Ho, San Diego, CA (US); Etienne F. Chaponniere, Rome (IT)

(73) Assignee: QUALCOMM Incorporated, San Diego, CA (US)

(*) Notice: Subject to any disclaimer, the term of this patent is extended or adjusted under 35 U.S.C. 154(b) by 1016 days.

(21) Appl. No.: 12/047,886

(22) Filed: Mar. 13, 2008

(65) Prior Publication Data
US 2008/0225824 A1    Sep. 18, 2008

Related U.S. Application Data

(60) Provisional application No. 60/895,394, filed on Mar. 16, 2007, provisional application No. 60/895,451, filed on Mar. 17, 2007.

(51) Int. Cl.
*H04J 3/16* (2006.01)

(52) U.S. Cl.
USPC .......................................... 370/346; 370/230

(58) Field of Classification Search
USPC ......... 370/346, 347, 348, 349, 230, 231, 235, 370/236.1
See application file for complete search history.

(56) References Cited

U.S. PATENT DOCUMENTS

| | | | | |
|---|---|---|---|---|
| 7,450,511 | B2 * | 11/2008 | Jang | .............................. 370/235 |
| 7,944,944 | B2 | 5/2011 | Jiang | |
| 2004/0143676 | A1 * | 7/2004 | Baudry et al. | ................. 709/237 |
| 2006/0056441 | A1 | 3/2006 | Jiang | |
| 2006/0285515 | A1 | 12/2006 | Julian et al. | |
| 2007/0054625 | A1 | 3/2007 | Beale | |
| 2008/0008152 | A1 | 1/2008 | Lohr et al. | |

(Continued)

FOREIGN PATENT DOCUMENTS

| | | |
|---|---|---|
| CN | 1691663 A | 11/2005 |
| CN | 1761260 A | 4/2006 |

(Continued)

OTHER PUBLICATIONS

"3rd Generation Partnership Project; Technical Specification Group Radio Access Network; Radio Link Control (RLC) protocol specification (Release 7)", 3GPP TS 25.322 V7.2.0 (Sep. 2006).

(Continued)

*Primary Examiner* — Dady Chery
(74) *Attorney, Agent, or Firm* — Kam T. Tam

(57) ABSTRACT

A data packet communication system employs radio link control (RLC) transmission between a transmitter and a receiver with an Automatic Repeat Request (ARQ) arrangement whereby polling of the receiver is accomplished with reduced amount of redundantly transmitted data, such as between an access node and terminal. Upon a polling event, such as emptying of a transmission buffer of the transmitter, expiration of a polling timer, or reaching a radio link control (RLC) protocol data units (PDUs) count threshold, the transmitter sends a polling command to the receiver. This polling command is smaller than any of the RLC PDUs, which are conventionally resent with a polling bit set to evoke a STATUS PDU from the receiver. With evolving communication standards tending toward larger PDUs, such as in excess of a kilobyte for HSPA+ (High-Speed Packet Access Evolution) and 3GPP LTE (Long Term Evolution), this inefficiency can be of increasing impact.

82 Claims, 6 Drawing Sheets

(56) References Cited

U.S. PATENT DOCUMENTS

| | | | |
|---|---|---|---|
| 2008/0043619 A1* | 2/2008 | Sammour et al. | 370/231 |
| 2008/0064444 A1 | 3/2008 | Yi | |
| 2008/0212561 A1* | 9/2008 | Pani et al. | 370/346 |
| 2009/0028126 A1 | 1/2009 | Meylan | |
| 2009/0290545 A1* | 11/2009 | Chun et al. | 370/329 |
| 2011/0110238 A1 | 5/2011 | Marinier | |

FOREIGN PATENT DOCUMENTS

| | | |
|---|---|---|
| EP | 1361689 A1 | 11/2003 |
| EP | 1494407 | 1/2005 |
| EP | 1589704 A2 | 10/2005 |
| EP | 1638237 | 3/2006 |
| EP | 1755355 A1 | 2/2007 |
| JP | 2007053747 A | 3/2007 |
| RU | 2251219 C2 | 4/2005 |
| RU | 2280958 C2 | 7/2006 |
| WO | 03047206 A1 | 6/2003 |
| WO | WO2006083149 A1 | 8/2006 |
| WO | WO2006116620 A2 | 11/2006 |
| WO | WO2006118418 A2 | 11/2006 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V1.0.0 (Mar. 2007).

Sheu et al., "An Ack-based polling strategy for supporting high performance and QoS in IEEE 802.11 wireless networks", Computer Communciations, Elsevier Science Publishes BV, Amsterdam, NL, vol. 29, No. 3, Feb. 1, 2006, pp. 358-371.

International Search Report—PCT/US08/057286, International Search Authority—European Patent Office—Dec. 3, 2008.

Written Opinion—PCT/US08/057286, International Search Authority—European Patent Office—Dec. 3, 2008.

3GPP TSG RAN WG2#57bis R2-071370,Fujitsu,RLC header format,Mar. 26, 2007.

3GPP TSG-RAN WG2 #57bis R2-071470,QUALCOMM Europe,L2 improvements and polling,Mar. 26, 2007.

3GPP TSG-RAN WG2 #60bis R2-080386,LG Electronics Inc.,Discussion on Poll indication,Jan. 14, 2008.

3GPP TSG-RAN WG2 R2-081124,Motorola,RLC Poll Indication When No Data to Transmit,Feb. 11, 2008.

3GPP: 3rd Generation Partnership Project; Technical Specification Group Radio Access Network; Radio Link Control (RLC) protocol specification (Release 6) TS25.322 V6.9.0,Oct. 17, 2006, p. 51.

"3rd Generation Partnership Project; Technical Specification Group Radio Access Network; Evolved Universal Terrestrial Radio Access (E-UTRA) Radio Link Control (RLC) protocol specification (Release 8)", 3GPP TS 36.322 V8.1.0 (Mar. 2008), p. 22-24,25-29.

"3rd Generation Partnership Project; Technical Specification Group Radio Access Network; Evolved Universal Terrestrial Radio Access (E-UTRA) and Evolved Universal Terrestrial Radio Access Network (E-UTRAN): Overall description; Stage 2 (Release x8)", 3GPP TS 36.300 V0.3.0 (Nov. 2006).

ETSI TS 125 322 v5.5.0, "Universal Mobile Telecommunications System (UMTS); Radio Link Control (RLC) protocol specification (3GPP TS 25.322 version 5.5.0 Release 5)," 3GPP Technical Specification, vol. 3-R2, XP014008755, ISSN: 0000-0001, Jun. 2003.

Taiwan Search Report—TW097109407—TIPO—Dec. 20, 2011.

* cited by examiner

TYPE = POLL 200
FIG. 3
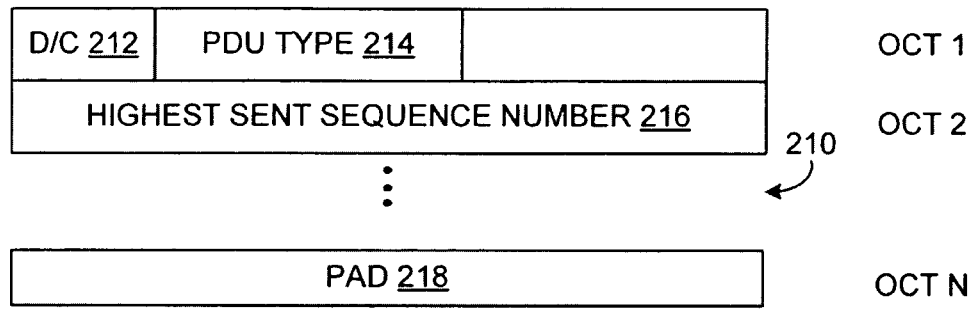
FIG. 4
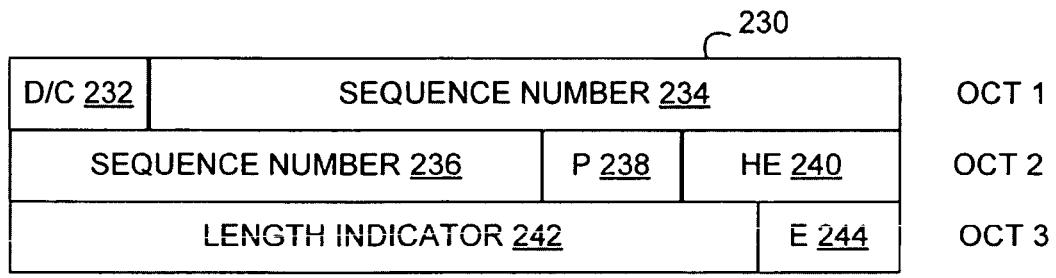
FIG. 5

METHOD AND APPARATUS FOR POLLING IN A WIRELESS COMMUNICATION SYSTEM

CLAIM OF PRIORITY UNDER 35 U.S.C. §119

The present Application for patent claims priority to Provisional Application No. 60/895,394 entitled "METHOD AND APPARATUS FOR POLLING IN A WIRELESS COMMUNICATION SYSTEM" filed 16 Mar. 2007, and assigned to the assignee hereof and hereby expressly incorporated by reference herein. The present Application for patent also claims priority to Provisional Application No. 60/895,451 entitled "METHOD AND APPARATUS FOR POLLING IN A WIRELESS COMMUNICATION SYSTEM" filed 17 Mar. 2007, and assigned to the assignee hereof and hereby expressly incorporated by reference herein.

FIELD OF INVENTION

The present description pertains to data packet transmission from a transmitter to a receiver with a radio access network for reliable acknowledged communication.

BACKGROUND

The layer two specification of the 3GPP (Third Generation Partnership Project) series of specifications features an Automatic Repeat Request (ARQ) mechanism as part of the Radio Link Control (RLC) protocol. When RLC creates Protocol Data Units (PDU), data is submitted to the lower layer and buffered until its reception is acknowledged by the receiver or the discard timer orders to discard the PDU. A monotonically increasing sequence number is assigned to each PDU allowing the receiver to re-order the stream of received PDUs as well as detect missing packets in the received sequence.

RLC specifies packet formats and procedures to carry buffer status information from the receiver via a STATUS PDU as well as a procedure for the transmitter to request that information, which is performed by setting a specified "Poll" bit in selected RLC PDUs.

Various timers and events trigger the transmission of either a Poll or a STATUS control commands. For instance, the transmitter may send a Poll command at periodic intervals, every time N PDUs are transmitted, or whenever the last data in the RLC buffer is transmitted. The receiver may send a STATUS PDU in response to a Poll command, autonomously at periodic intervals (i.e., every time N PDUs are received), or whenever a missing PDU is detected because of a hole in the sequence numbers.

When the transmitter is to send a Poll, the transmitter selects a RLC PDU that is not yet acknowledged and re-transmits the PDU with the Poll bit set to "1" in order to convey the Poll command to the receiver. An example of such an implementation is in Universal Mobile Telecommunication System (UMTS) release 5. Changes in the system architecture of both HSPA+ (High-Speed Packet Access Evolution) and 3GPP LTE (Third Generation Partnership Program Long Term Evolution) are to support larger PDUs in order to reduce the overheads. While retransmitting a complete PDU may have been a satisfactory solution for PDUs of modest size, it may become wasteful to retransmit a large PDU in the newer systems.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof various aspects are described in connection with a data packet transmission approach wherein polling requests are transmitted in a form that obviates a requirement to retransmit user data and thus increase data efficiency.

In one aspect, a method is provided for reliable transmission from a local transmitter to a remote receiver with reduced transmission of potentially redundant data. Radio link commands are transmitted from a local transmitter to a remote receiver. A polling command that substantially omits previously transmitted data of RLC PDUs is transmitted in response to detecting a polling event. Subsequently, a status PDU from the receiver is received.

In another aspect, at least one processor is configured for reliable transmission from a local transmitter to a remote receiver with reduced transmission of potentially redundant data. A first module transmits radio link commands from a local transmitter to a remote receiver. A second module transmits a polling command without requiring transmission of user-plane data in response to detecting a polling event. A third module receives a status PDU from the remote receiver.

In an additional respect, a computer program product provides for reliable transmission from a transmitter to a receiver with reduced transmission of potentially redundant data. A computer-readable medium has a first set of codes that causes a computer to transmit radio link command from a local transmitter to a remote receiver. A second set of codes causes the computer to transmit a polling command without requiring transmission of user-plane data in response to detecting a polling event. A third set of codes causes the computer to receive a status PDU.

In yet a further aspect, an apparatus provides for reliable transmission from a local transmitter to a remote receiver with reduced transmission of potentially redundant data. A means is provided for transmitting radio link command from a local transmitter to a remote receiver. Another means is provided for transmitting a polling command without requiring transmission of user-plane data in response to detecting a polling event. In addition, yet another means is provided for receiving a status PDU.

In yet an additional aspect, an apparatus is provided for reliable transmission from a local transmitter to a remote receiver with reduced transmission of potentially redundant data, including a memory. A local transmitter transmits radio link command contained in the memory to a remote receiver. A polling component generates and causes the local transmitter to transmit a polling command without requiring transmission of user-plane data in response to detecting a polling event. A local receiver receives a status PDU from the remote receiver.

In another aspect, a method is provided for reliable reception at a local receiver from a remote transmitter with reduced reception of potentially redundant data. Radio link commands are received from a transmitter to a receiver. A polling command is received that substantially omits previously transmitted data of RLC PDUs in response to the transmitter detecting a polling event. A status PDU is then sent based upon signaling information.

In yet an additional aspect, at least one processor is configured for reliable reception at a local receiver from a remote transmitter with reduced reception of potentially redundant data. A first module receives radio link command from a remote transmitter to a local receiver. A second module receives a polling command without requiring transmission of user-plane data in response to the remote transmitter detecting a polling event. A third module sends a status PDU based upon signaling information.

In an additional aspect, a computer program product provides for reliable reception at a local receiver from a remote transmitter with reduced reception of potentially redundant data. A computer-readable medium has a first set of codes that causes a computer to receive radio link commands from a remote transmitter to a local receiver. A second set of codes causes the computer to receive a polling command without requiring transmission of user-plane data in response to the remote transmitter detecting a polling event. A third set of codes causes the computer to send a status PDU based upon signaling information.

In yet another aspect, an apparatus provides for reliable reception at a local receiver from a remote transmitter with reduced reception of potentially redundant data. A means is provided for receiving radio link commands from a remote transmitter and to a local receiver. Another means is provided for receiving a polling command without requiring transmission of user-plane data in response to the transmitter detecting a polling event. An additional means is provided for sending a status PDU based upon signaling information.

In yet a further aspect, an apparatus is provided for reliable reception at a local receiver from a remote transmitter with reduced reception of potentially redundant data by including a memory and a local receiver that receives radio link commands from a remote transmitter for storing in the memory and for receiving a polling command without requiring transmission of user-plane data. A status component generates and causing a receiver to transmit a Status PDU in response to the polling command. The remote transmitter receives a status PDU.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 3 illustrates a block diagram of a data structure of a SUper FIelds (SUFI) format used to communicate poll information according to one aspect;

FIG. 4 illustrates a block diagram of a data structure of a Radio Link Control (RLC) Protocol Data Unit (PDU) format used to communicate poll information according to another aspect;

FIG. 5 illustrates a block diagram of an illustrative data structure of an RCL AM Data (AMD) PDU of yet another aspect;

DETAILED DESCRIPTION

Figure 1:
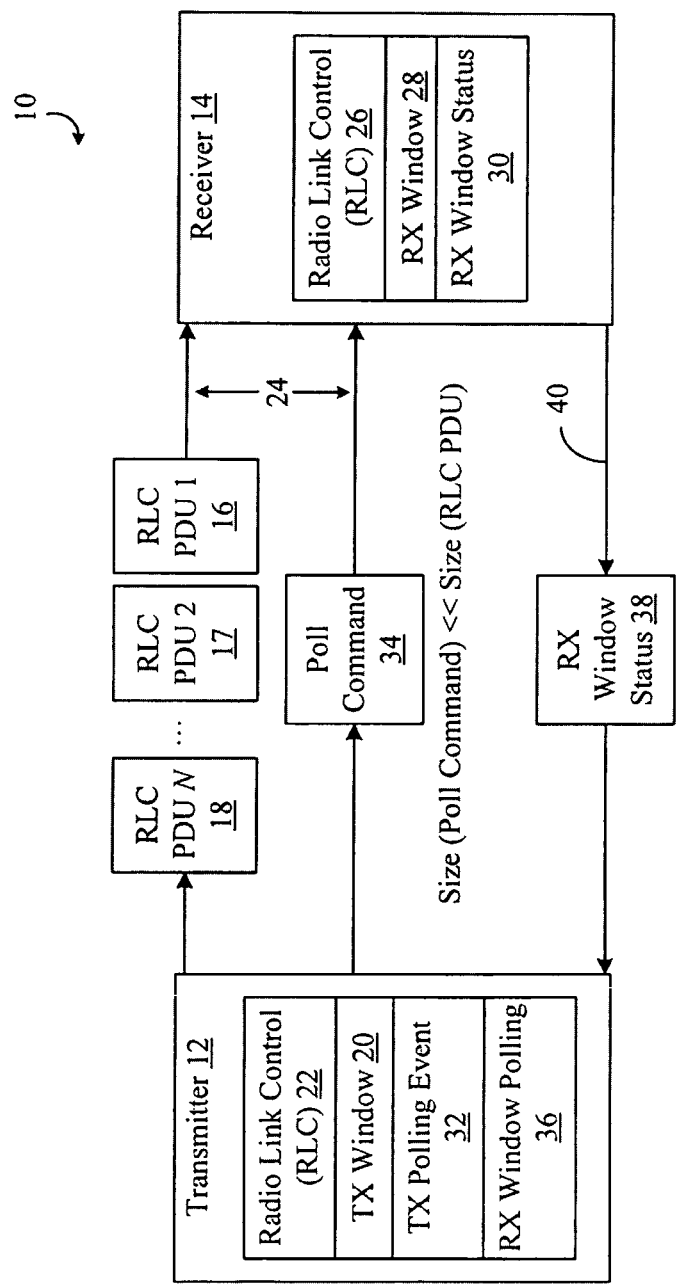
FIG. 1 illustrates a block diagram of a communication system for reliable acknowledged data packet transmission by a transmitter and reception by a receiver.

A data packet communication system employs Radio Link Control (RLC) transmission between a transmitter and a receiver with an Automatic Repeat Request (ARQ) arrangement whereby polling of the receiver is accomplished with a reduced amount of potentially redundan transmitted data. Upon a polling event, such as emptying of a transmission buffer of the transmitter, expiration of a polling timer, reaching an RLC protocol data units (PDUs) count threshold or reaching a number of outstanding transmitted byte-threshold, the transmitter sends a polling conmnand to the receiver. This polling command may be smaller than any of the RLC PDUs. In the illustrative aspects, the polling command can be a Status PDU sent from the access node that includes a Super Field (SUFI) for polling. The polling command can be a polling PDU, which is a dedicated control. The polling command can be a degenerated RLC PDU sized to completely eliminate data. Thus, use of a polling command avoids using the convention approach of resending a full RLC PDU with a polling bit set to evoke a STATUS PDU from the access terminal. With evolving conunuuication standards tending toward larger PDUs, such as in excess of a kilobyte for HSPA+(High-Speed Packet Access Evolution) and 3GPP LTE (i.e., Long Term Evolution (LTE)), this inefficiency can be of increasing impact.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process ar g on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Turning to the Drawings, in FIG. 1, a communication system 10 provides reliable data packet transmission from an transmitter 12 to a receiver 14. User data is segmented into a plurality of Radio Link Control (RLC) PDUs 16, 17, 18 that are stored in a transmitter (TX) window 20 until transmitted by a Radio Link Control 22 across a link 24 to be received by the receiver 14, whose RLC 26 stores the received RLC PDUs 16-18 in an RX window 28 for processing with signaling status tracked by an RX window status component 30. A TX window poll event (e.g., timer) component 32 of the transmitter 12 determines a need for a status of the RX window 28 of the receiver 14. A poll command message 34 is prepared by an RX window polling component 36 and sent over the link 24 to the receiver 14, which in turn responds with an RX window status 38 over an uplink 40.

It should be appreciated with the benefit of the present disclosure that a radio link control is a protocol in the 'layer two' of a telecommunication system that, among other things enable ARQ (Automatic Repeat re-Quest) as for example the RLC of HSPA and the RLC of LTE in 3GPP. Furthermore, the techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known in the art.

It should be appreciated with the benefit of the present disclosure hnat prior to the evolutions being brought by HSPA+ and LTE, RLC segmented user data into fixed size PDUs; for instance 20, 40 or 80 bytes. Because of this, it is appreciated that in order to initiate a polling after the transmit buffer is emptied, one PDU of ~20, 40 or 80 bytes needs to be re-transmitted with the Poll bit set. However, this method introduces overheads that are not significant compared to the size of the user's payload.

Communication protocols for HSPA+ and LTE allow variable size RLC PDUs in order to improve the protocol efficiency and reduce processing. RLC PDU size is now selected according to the size of the transport block allocated on the channel. Given the very high throughputs enabled at the physical layer, the size of RLC PDU can be in excess of a kilobyte. Without modification of the existing specifications, it is appreciated that RLC would need to transmit one such possibly large RLC PDU in order to poll receiver. Various aspects relate to initiating a poll in a wireless communication system that minimizes the overhead necessary for communicating the polling information. Particularly, one aspect relates to communicating poll information without requiring retransmission of previously transmitted user data. Discussed below are various methods for communicating poll information that are more efficient than current methods.

Figure 2:
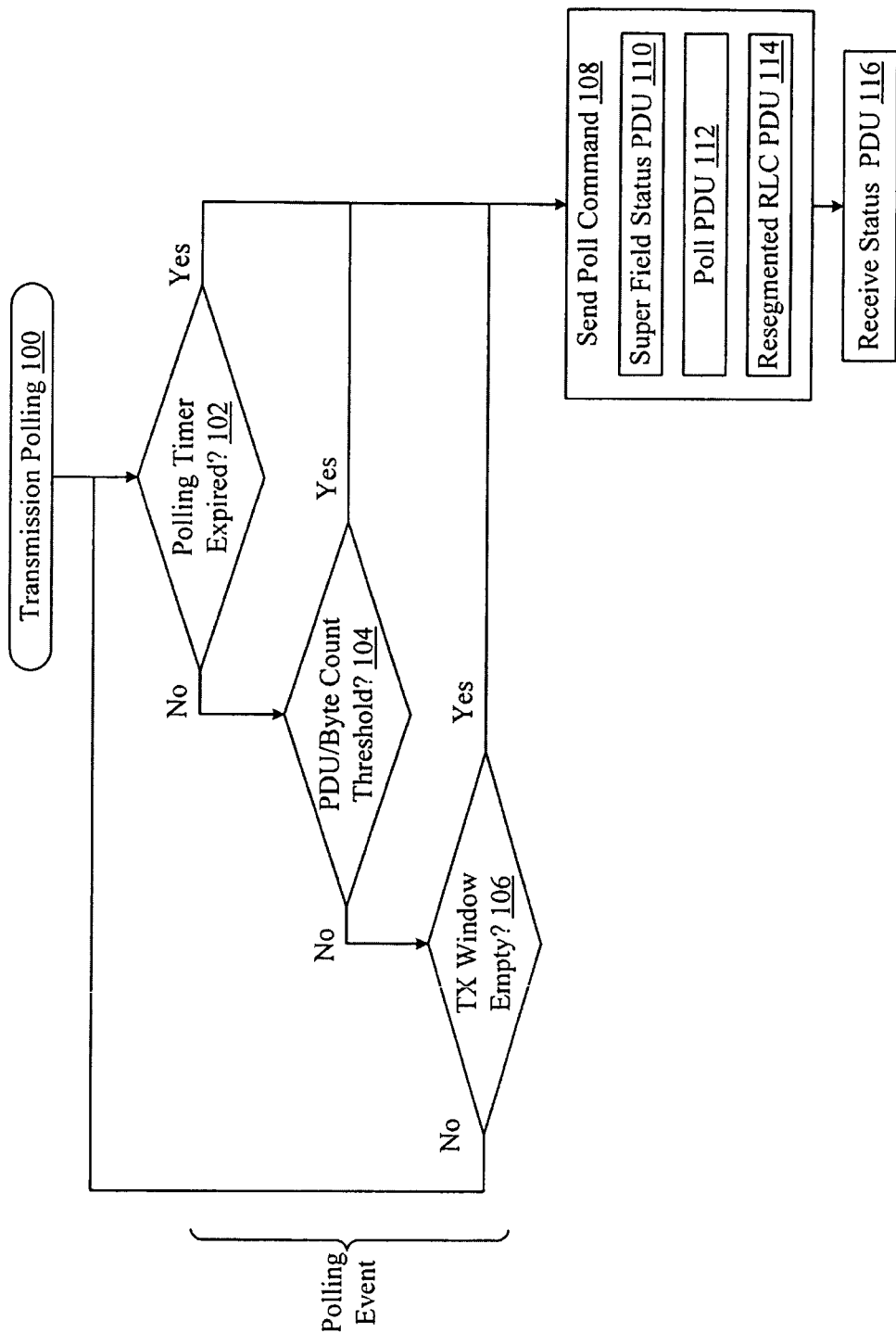
FIG. 2 illustrates a flow diagram for a methodology for reliable transmission utilizing a polling command.

In FIG. 2, a methodology 100 for transmission polling depicts a plurality of ways of detecting a poll event as well as a plurality of ways for formatting a poll command 34, rather than retransmitting an RLC PDU 16-18, for increased data transmission efficiency. Each type of poll command 34, used alternatively or selectively, is substantially smaller than the RLC PDUs 16-18. In block 102, a determination is made as to whether the polling event is the expiration of a polling timer. If not, then a further determination is made in block 104 as to whether a PDU count or byte count threshold have been met. If not, yet a further determination is made in block 106 as to whether a transmitter (TX) window is empty. It should be noted that this invention could be applied irrespective of which polling event is used to initiate the polling command. The invention applies to other polling events that may be defined in the future. If not, the process returns to block 102 to continue waiting for a polling event to be detected. It should be appreciated that only one or two such events may be monitored.

If any of the polling events are detected, for instance in block 102, 104, 106, then a send poll command is performed in block 108. In the illustrative versions, three poll commands 34 are described, these being poll with a Status PDU (block 110), poll with a Polling PDU (block 112), and zero-data RLC PDU (block 114). Then the transmitter receives the response from the receiver, which is a Status PDU in block 116.

Poll with STATUS PDU. The STATUS PDU is a flexible container for information elements named SUper FIelds (SUFI). Numerous SUFIs are defined, including the Ack SUFI used to acknowledge the highest in sequence received sequence number, the List SUFI used to list sequences of Ack/Nak from a starting sequence number, the bitmap SUFI that represents Ack/Nak in the form of a bitmap and so on.

Both the transmitter (e.g., access node) and the receiver (e.g., access terminal) may use the STATUS PDU to convey RLC signaling information to their peer. According to one aspect, a new SUFI 200 may be defined that can be used to convey a Poll command. One possible format for the Poll SUFI 200 is shown in FIG. 3, which comprises a data field of type set equal to "Poll" that is included in a Status PDU.

When polling is needed, the transmitter creates a STATUS PDU containing a Poll SUFI 200 such as the example shown in FIG. 3. The STATUS PDU containing the POLL SUFI 200 optionally contains the highest sequence number transmitted to maximize the information available at the receiver when preparing the status report. Alternatively a new SUFI can be defined in order to carry the highest sequence number transmitted separately from the POLL SUFI.

Poll with Polling PDU. RLC can define various packet formats, among them are formats used to carry user data such as the RLC Ack (acknowledge) Mode PDU (AMD PDU), the RLC UnAck (unacknowledged) Mode PDU (UMD PDU), the STATUS message defined above, or the RESET PDU used to reset the receiver.

According to another aspect, a new RLC PDU data structure may be defined to convey a Poll command. A possible format for the Polling PDU is as shown with particularity in FIG. 4, beginning with a data or control (D/C) bit 212 and PDU type field 214 in the first octet. The POLLING PDU 210 optionally may contain the highest sequence number field 216 depicted in the second octet transmitted to maximize the information available at the receiver. Pad fields 218 in subsequent octets can be included to maintain a length of the PDU 210. If present the D/C bit indicates Control. If present, the PDU type field indicates Poll. The presence of highest sequence number may be optional and its inclusion may be indicated with a bit.

Poll with zero-length RLC AME PDU. Alternatively or in addition to utilizing a control data structure such as a Polling PDU 210, an RLC AMD PDU format can be adapted to facilitate a resegmented AMD PDU 230 that contains no data. Data information from a higher layer is called an AM Data (AMD). FIG. 5 depicts an illustrative general format of an AMD PDU 230 with a D/C bit 232 and sequence number field 234 in the first octet, a sequence number field 236, poll bit 238, and two-bit HE field 240 in the second octet that indicates whether the next octet is header information (LI) or data, and a length indicator field 242 and one-bit E (Extension) field in the third octet that indicates whether the next octet is header or data.

If the highest transmitted sequence number is N, the Poll command may be conveyed to the receiver by setting the Poll bit to "1" on a RLC AM) PDU 210 with a payload of length "0". The length indicator may be set to "0". The receiver interprets a PDU with zero data and poll bit set as a polling command and does not attempt to store the received PDU in its receive buffers. Depending on specific semantics, the highest sequence number along with poll command may be indicated by setting the sequence number in the PDU to N+1 or N+d, where d is an integer.

It should be appreciated, however, that the receiver procedures can be modified to cope with the reception of an empty AMD PDU as mentioned above.

Aspects of the present invention may be related to systems implementing any version of the Radio Link Control (RLC) protocol specification, including but not limited to the Release 7 3GPP TS 25.322 V7.2.0 (2006-09) and Specification Group Radio Access Network; Evolved Universal Terrestrial Radio Access (E-UTRA) and Evolved Universal Terrestrial Radio Access Network (E-UTRAN); Overall description; Stage 2 (Release 8) 3GPP TS 36.300. It should be appreciated however that various aspects may be applicable to other types of networks.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-signal-out or a multiple-in-multiple-out (MIMO) system.

A MIMO system employs multiple ($N_T$) transmit antennas and multiple ($N_R$) receive antennas for data transmission. A MIMO channel formed by the Nr transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beam forming gain on the forward link when multiple antennas are available at the access point.

Figure 6:
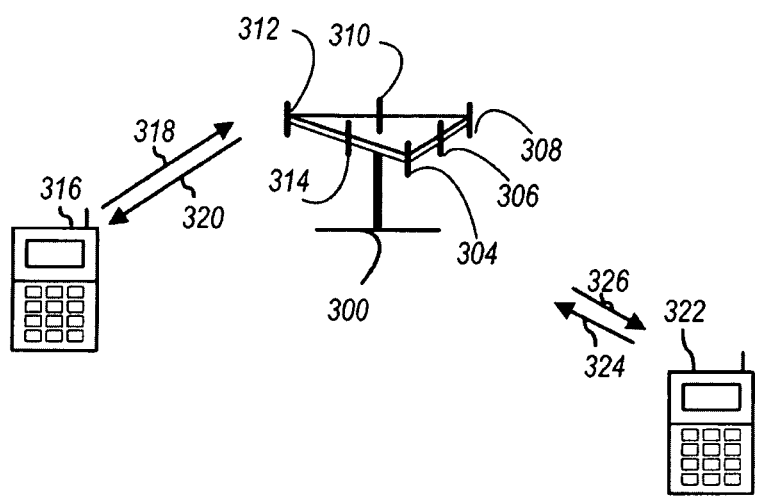
FIG. 6 illustrates a diagram of a multiple access wireless communication system according to one aspect for supporting polling commands.

Referring to FIG. 6, a multiple access wireless communication system according to one aspect is illustrated. An access point 300 (AP) includes multiple antenna groups, one including 304 and 306, another including 308 and 310, and an additional including 312 and 314. In FIG. 6, only two antennas are shown for each antenna group, however, more or fewer antennas may be utilized for each antenna group. Access terminal 316 (AT) is in communication with antennas 312 and 314, where antennas 312 and 314 transmit information to access terminal 316 over forward link 320 and receive information from access terminal 316 over reverse link 318. Access terminal 322 is in communication with antennas 306 and 308, where antennas 306 and 308 transmit information to access terminal 322 over forward link 326 and receive information from access terminal 322 over reverse link 324. In a FDD system, communication links 318, 320, 324 and 326 may use different frequency for communication. For example, forward link 320 may use a different frequency then that used by reverse link 318.

Each group of antennas and/or the area in which they are designed to communicate is often referred to as a sector of the access point. In the aspect, antenna groups each are designed to communicate to access terminals in a sector of the areas covered by access point 300.

In communication over forward links 320 and 326, the transmitting antennas of access point 300 utilize beam forming in order to improve the signal-to-noise ratio of forward links for the different access terminals 316 and 324. In addition, an access point using beam forming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 7:
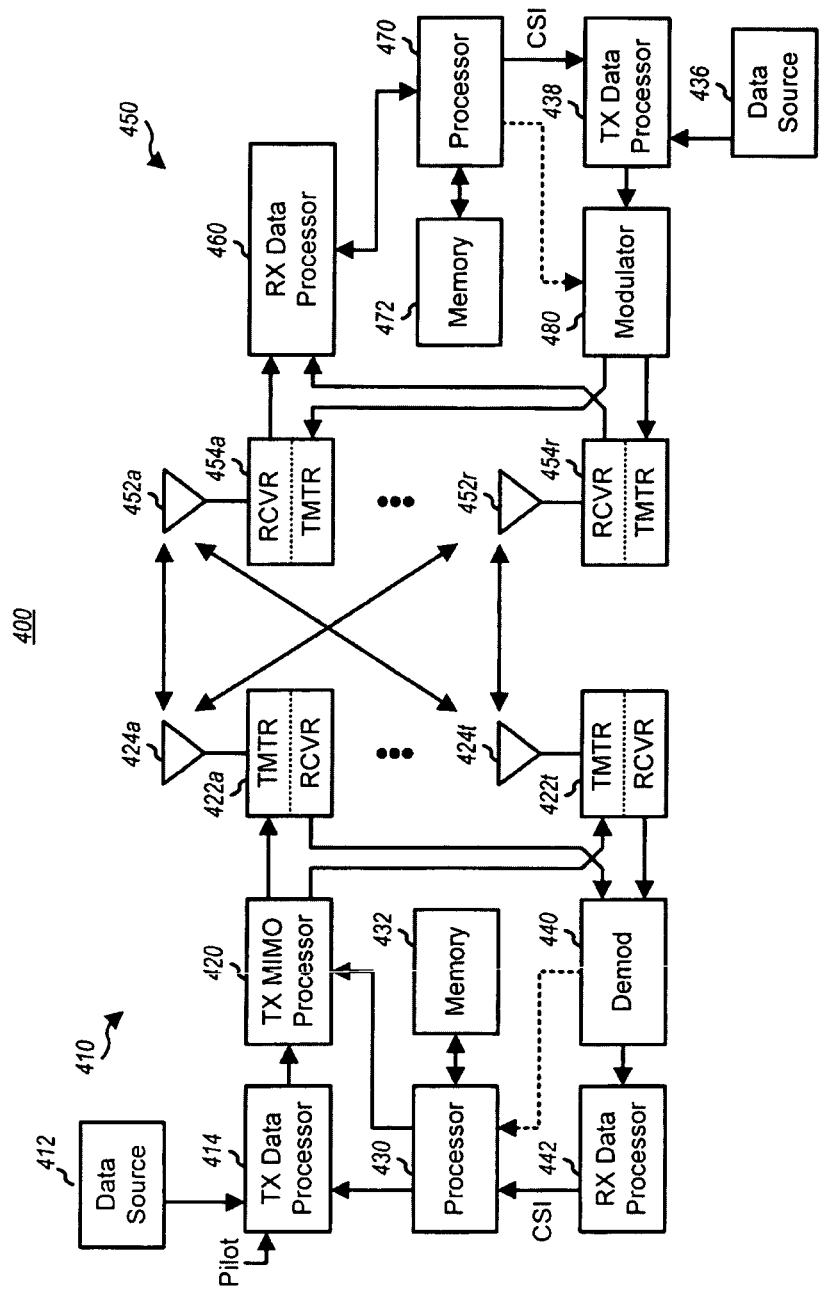
FIG. 7 illustrates a schematic block diagram of a communication system for supporting polling commands.

FIG. 7 is a block diagram of an aspect of a transmitter system 410 (also known as the access point) and a receiver system 450 (also known as access terminal) in a MIMO system 400. At the transmitter system 410, traffic data for a number of data streams is provided from a data source 412 to a transmit (TX) data processor 414.

In an aspect, each data stream is transmitted over a respective transmit antenna. TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 430.

The modulation symbols for all data streams are then provided to a TX MIMO processor 420, which may further process the modulation symbols (e.g., for OFDM). TX MIMO processor 420 then provides $N_T$ modulation symbol streams to $N_T$ transmitters (TMTR) 422a through 422t. In certain implementations, TX MIMO processor 420 applies beam-forming weights to the symbols of the data streams and to the antenna from which the symbol is being transmitted.

Each transmitter 422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 422a through 422t are then transmitted from $N_T$ antennas 424a through 424t, respectively.

At receiver system 450, the transmitted modulated signals are received by $N_R$ antennas 452a through 452r and the received signal from each antenna 452 is provided to a respective receiver (RCVR) 454a through 454r. Each receiver 454 conditions (e.g., filters, amplifies, and downconverts) a respective received signal, digitizes the conditioned signal to provide samples, and further processes the samples to provide a corresponding "received" symbol stream.

An RX data processor 460 then receives and processes the $N_R$ received symbol streams from $N_R$ receivers 454 based on a particular receiver processing technique to provide $N_T$ "detected" symbol streams. The RX data processor 460 then demodulates, deinterleaves, and decodes each detected symbol stream to recover the traffic data for the data stream. The processing by RX data processor 460 is complementary to that performed by TX MIMO processor 420 and TX data processor 414 at transmitter system 410.

A processor 470 periodically determines which pre-coding matrix to use (discussed below). Processor 470 formulates a reverse link message comprising a matrix index portion and a rank value portion.

The reverse link message may comprise various types of information regarding the communication link and/or the received data stream. The reverse link message is then processed by a TX data processor 438, which also receives traffic data for a number of data streams from a data source 436, modulated by a modulator 480, conditioned by transmitters 454a through 454r, and transmitted back to transmitter system 410.

At transmitter system 410, the modulated signals from receiver system 450 are received by antennas 424, conditioned by receivers 422, demodulated by a demodulator 440, and processed by a RX data processor 442 to extract the reserve link message transmitted by the receiver system 450. Processor 430 then determines which pre-coding matrix to use for determining the beam forming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bidirectional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PS-DCH); Broadband Pilot Channel (BPICH).

Figure 8:
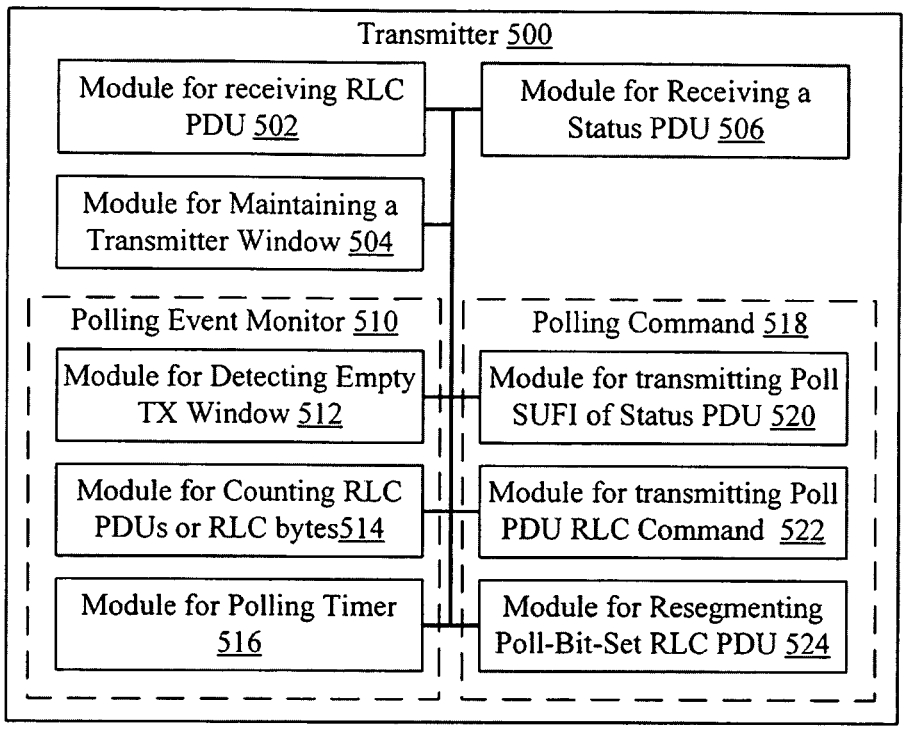
FIG. 8 illustrates a block diagram for a transmitter having modules for sending a polling command to a receiver.

In FIG. 8, a transmitter 500 includes means, depicted as a module 502, for transmitting a plurality of RLC PDUs. The transmitter 500 includes a means, depicted as a module 504, for maintaining a transmitter window. The transmitter 500 includes a means, depicted as a module 506, for receiving a Status PDU from the receiver. The transmitter 500 includes a means, depicted as function 510 for monitoring for a polling event that includes one or more three illustrative modules. First, a module 512 is provided for detecting an empty transmitter window. Second, a module 514 is provided for counting RLC PDUs or RLC outstanding bytes to detect reaching a threshold. Third, a module 516 is provided for a polling timer. The transmitter 500 includes a function 518 for creating a polling command that includes one or more of three illustrative modules. First, a module 520 is provided for transmitting a poll super field (SUFI) incorporated into a Status PDU. Second, a module 522 is provided for transmitting a Polling PDU RLC command. Third, a module 524 is provided for transmitting a RLC PDU with no data and the poll bit set.

Figure 9:
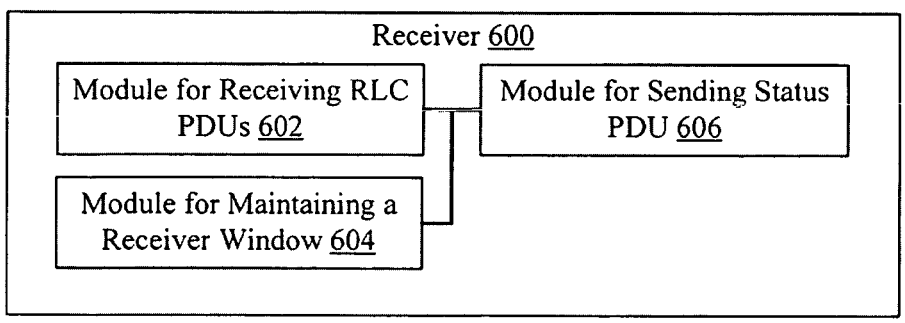
FIG. 9 illustrates a block diagram for a receiver having modules for receiving a polling command and responding with a status PDU.

In FIG. 9, a receiver 600 includes means, depicted as a module 602, for receiving a plurality of RLC PDUs. The receiver 600 includes a means, depicted as a module 604, for maintaining a receiver window. The receiver 600 includes a means, depicted as a module 606, for sending a Status PDU in response to a poll command.

The receiver 600 includes means to interpret a RLC PDU with no data and the poll bit set as a polling command and does not alter its reception buffers upon reception.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, transmitter (e.g., access nod) can infer or predict capabilities of a data channel and a receiver (e.g., access terminal) so that polling events are scheduled in an efficient manner as well as selecting a type of poll command based on previous interactions with the same or like machines under similar conditions.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for transmitting data from a local transmitter o a remote receiver, comprising:
   transmitting a radio link control command from the local transmitter to the remote receiver; and
   transmitting a polling command without requiring transmission of user-plane data in response to detecting a polling event, wherein the polling command is smaller than the radio link control command, and wherein transmitting the polling command comprises at least one of transmitting a radio link control status protocol data unit and transmitting a radio link control polling protocol data unit.

2. The method of claim 1, wherein:
   the radio link control status protocol data unit is a flexible container containing super fields for transmitting control information to a peer; and
   the radio link control status protocol data unit comprises a super field indicating the polling command.

3. The method of claim 2, wherein the super field indicating the polling command also informs of a sequence number transmitted by the local transmitter.

4. The method of claim 2, wherein the super field indicating the polling command also informs of a highest sequence number transmitted by the local transmitter.

5. The method of claim 1, wherein the radio link control polling protocol data unit is defined as a control channel entry.

6. The method of claim 5, wherein the radio link control polling protocol data unit also informs of a sequence number transmitted by the local transmitter.

7. The method of claim 5, wherein the radio link control polling protocol data unit also informs of a highest sequence number transmitted by the local transmitter.

8. The method of claim 1, wherein transmitting radio link control protocol data units conforms to High-Speed Packet Access Evolution protocols.

9. The method of claim 1, wherein transmitting radio link control protocol data units conforms to Third Generation Partnership Project Long Term Evolution protocols.

10. A method for transmitting data from a local transmitter to a remote receiver, comprising:
   transmitting a radio link control command from the local transmitter to the remote receiver;
   transmitting a polling command without requiring transmission of user-plane data in response to detecting a polling event, wherein transmitting the polling command comprises transmitting a protocol data unit with zero-length data and a header portion of a previously transmitted protocol data unit; and
   receiving a status protocol data unit.

11. The method of claim 10, further comprising:
   setting a polling bit of the protocol data unit to indicate the polling command.

12. The method of claim 10, further comprising a sequence number of the protocol data unit to an already transmitted sequence number.

13. The method of claim 10, further comprising a sequence number of the protocol data unit to a highest transmitted sequence number.

14. The method of claim 10, further comprising a sequence number of the protocol data unit to a highest transmitted sequence number incremented by one.

15. The method of claim 10, wherein transmitting the protocol data unit does not affect a state of a receive buffer but triggers a buffer status report for all sequence numbers that are relevant given an indication in the protocol data unit.

16. The method of claim 10, wherein transmitting the protocol data unit does not affect a state of a receive buffer.

17. At least one processor configured for transmitting data from a local transmitter to a remote receiver, comprising:
   a first module for transmitting a radio link command from the local transmitter to the remote receiver; and
   a second module for transmitting a polling command without requiring transmission of user-plane data in response to detecting a polling event, wherein the polling command is smaller than the radio link command, and wherein transmitting the polling command comprises at least one of transmitting a radio link control status protocol data unit and transmitting a radio link control polling protocol data unit.

18. A computer program product for transmitting data from a local transmitter to a remote receiver, comprising:
   a non-transitory computer-readable medium, comprising:
      a first set of codes for causing a computer to transmit a radio link command from the local transmitter to the remote receiver; and
      a second set of codes for causing the computer to transmit a polling command without requiring transmission of user-plane data in response to detecting a polling event, wherein the polling command is smaller than the radio link command, and wherein transmitting the polling command comprises at least one of transmitting a radio link control status protocol data unit and transmitting a radio link control polling protocol data unit.

19. An apparatus for transmitting data from a local transmitter to a remote receiver, comprising:
   means for transmitting a radio link command from the local transmitter to the remote receiver; and
   means for transmitting a polling command without requiring transmission of user-plane data in response to detecting a polling event, wherein the polling command is smaller than the radio link command, and wherein transmitting the polling command comprises at least one of transmitting a radio link control status protocol data unit and transmitting a radio link control polling protocol data unit.

20. The apparatus of claim 19 wherein the radio link control status protocol data unit is a flexible container containing super fields for transmitting control information to a peer, and the radio link control status protocol data unit comprises a super field indicating the polling command.

21. The apparatus of claim 20, wherein the super field indicating the polling command also informs of a sequence number transmitted by the local transmitter.

22. The apparatus of claim 20, wherein the super field indicating the polling command also informs of a highest sequence number transmitted by the local transmitter.

23. The apparatus of claim 19, wherein the radio link control polling protocol data unit is defined as a control channel entry.

24. The apparatus of claim 23, wherein the radio link control polling protocol data unit also informs of a sequence number transmitted by the local transmitter.

25. The apparatus of claim 23, wherein the radio link control polling protocol data unit also informs of a highest sequence number transmitted by the local transmitter.

26. An apparatus for transmitting data to a remote receiver, comprising:
   a memory;
   a local transmitter for transmitting a radio link command contained in the memory to the remote receiver; and
   a polling component for generating and causing the local transmitter to transmit a polling command without requiring transmission of user-plane data in response to detecting a polling event, wherein the polling command is smaller than the radio link command, and wherein transmitting the polling command comprises at least one of transmitting a radio link control status protocol data unit and transmitting a radio link control polling protocol data unit.

27. The apparatus of claim 26, wherein:
   the radio link control status protocol data unit is a flexible container containing super fields for transmitting signaling information to a peer; and
   the polling command comprises a polling super field of the radio link control status protocol data unit.

28. The apparatus of claim 27, wherein the polling super field also informs of a sequence number transmitted by the local transmitter.

29. The apparatus of claim 27, wherein the polling super field also informs of a highest sequence number transmitted by the local transmitter.

30. The apparatus of claim 26, wherein the polling component defines the radio link control polling protocol data unit as a control channel entry for transmission from the local transmitter to the remote receiver.

31. The apparatus of claim 30, wherein the radio link control polling protocol data unit also informs of a sequence number transmitted by the local transmitter.

32. The apparatus of claim 30, wherein the radio link control polling protocol data unit also informs of a highest sequence number transmitted by the local transmitter.

33. The apparatus of claim 26, wherein the local transmitter is further configured to transmit protocol data units conforming to High-Speed Packet Access Evolution protocols.

34. The apparatus of claim 26, wherein the local transmitter is further configured to transmit protocol data units conforming to Third Generation Partnership Project Long Term Evolution protocols.

35. An apparatus for transmitting data to a remote receiver, comprising:
   a memory;
   a local transmitter for transmitting a radio link command contained in the memory to the remote receiver;
   a polling component for generating and causing the local transmitter to transmit a polling command without requiring transmission of user-plane data in response to detecting a polling event, wherein transmitting the polling command comprises transmitting a protocol data unit with zero-length data and a header portion of a previously transmitted protocol data unit; and
   a local receiver for receiving a radio link control status protocol data unit from the remote receiver.

36. The apparatus of claim 35, wherein the polling component is further configured to:
   set a polling bit of the protocol data unit to indicate the polling command.

37. The apparatus of claim 35, wherein the polling component is further configured to set a sequence number of the protocol data unit to an already transmitted sequence number.

38. The apparatus of claim 35, wherein the polling component is further configured to set a sequence number of the protocol data unit to a highest transmitted sequence number.

39. The apparatus of claim 35, wherein the polling component is further configured to set a sequence number of the protocol data unit to a highest transmitted sequence number incremented by one.

40. The apparatus of claim 35, wherein the polling component is further configured to set a sequence number of the protocol data unit to a next available sequence number.

41. The apparatus of claim 35, wherein transmitting the protocol data unit does not affect a state of a receive buffer.

42. A method for receiving data from a remote transmitter, comprising:
   receiving a radio link command from the remote transmitter; and receiving a polling command without requiring reception of user-plane data, wherein the polling command is smaller than the radio link command, and wherein receiving the polling command comprises at least one of receiving a radio link control status protocol data unit and receiving a radio link control polling protocol data unit.

43. The method of claim 42, wherein: the radio link control status protocol data unit is a flexible container defined as containing super fields for transmitting signaling information to a peer; and
   the polling command comprises a polling super field of the radio link control status protocol data unit.

44. The method of claim 43, wherein the polling super field also informs of a sequence number transmitted by the remote transmitter.

45. The method of claim 43, wherein the polling super field also informs of a highest sequence number transmitted by the remote transmitter.

46. The method of claim 42, wherein the radio link control polling protocol data unit is defined as a control channel entry.

47. The method of claim 46, wherein the radio link control polling protocol data unit also informs of a sequence number transmitted by the remote transmitter.

48. The method of claim 46, wherein the radio link control polling protocol data unit also informs of a highest sequence number transmitted by the remote transmitter.

49. The method of claim 42, wherein receiving protocol data units conforms to High-Speed Packet Access Evolution protocols.

50. The method of claim 42, wherein receiving protocol data units conforms to Third Generation Partnership Project Long Term Evolution protocols.

51. A method for receiving data from a remote transmitter, comprising:
   receiving a radio link command from the remote transmitter;
   receiving a polling command without requiring reception of user-plane data, wherein receiving the polling command comprises receiving a protocol data unit with zero-length data and a header portion of a previously received protocol data unit; and sending a status protocol data unit based upon signaling information.

52. The method of claim 51,
   wherein a polling bit of the protocol data unit is set to indicate the polling command.

53. The method of claim 51, a sequence number of the protocol data unit is set to an already transmitted sequence number.

54. The method of claim 51, a sequence number of the protocol data unit is set to a highest transmitted sequence number.

55. The method of claim 51, wherein a sequence number of the protocol data unit is set to a highest transmitted sequence number incremented by one.

56. The method of claim 51, wherein the protocol data unit comprises a sequence number set to a next available sequence number.

57. The method of claim 51, wherein receiving the protocol data unit does not affect a state of a receive buffer.

58. At least one processor configured for receiving data from a remote transmitter, comprising:
   a first module for receiving a radio link command from the remote transmitter; and
   a second module for receiving a polling command without requiring reception of user-plane data, wherein the polling command is smaller than the radio link command, and wherein receiving the polling command comprises at least one of receiving a radio link control status protocol data unit and receiving a radio link control polling protocol data unit.

59. A computer program product for receiving data from a transmitter, comprising:
   a non-transitory computer-readable medium, comprising:
      a first set of codes for causing a computer to receive a radio link command from the transmitter; and
      a second set of codes for causing the computer to receive a polling command without requiring reception of user-plane data, wherein the polling command is smaller than the radio link command, and wherein receiving the polling command comprises at least one of receiving a radio link control status protocol data unit and receiving a radio link control polling protocol data unit.

60. An apparatus for receiving data from a transmitter, comprising:
means for receiving a radio link command from the transmitter; and
means for receiving a polling command without requiring reception of user-plane data, wherein the polling command is smaller than the radio link command, and wherein receiving the polling command comprises at least one of receiving a radio link control status protocol data unit and receiving a radio link control polling protocol data unit.

61. The apparatus of claim 60, wherein the radio link control status protocol data unit is a flexible container defined as containing super fields for transmitting signaling information to a peer, and the polling command comprises a polling super field of the radio link control status protocol data unit.

62. The apparatus of claim 61, wherein the polling super field also informs of a sequence number transmitted by the remote transmitter.

63. The apparatus of claim 61, wherein the polling super field also informs of a highest sequence number transmitted by the remote transmitter.

64. The apparatus of claim 60, wherein the radio link control polling protocol data unit is defined as a control channel entry.

65. The apparatus of claim 64, wherein the radio link control polling protocol data unit also informs of a sequence number transmitted by the remote transmitter.

66. The apparatus of claim 61, wherein the radio link control polling protocol data unit also informs of a highest sequence number transmitted by the remote transmitter.

67. An apparatus for receiving data from a remote transmitter, comprising:
a memory; and
a receiver for receiving a radio link command from the remote transmitter for storing in the memory, and for receiving a polling command without requiring reception of user-plane data, wherein the polling command is smaller than the radio link command, and wherein receiving the polling command comprises at least one of receiving a radio link control status protocol data unit and receiving a radio link control polling protocol data unit.

68. The apparatus of claim 67, wherein:
the radio link control status protocol data unit is a flexible container defined as containing super fields for transmitting signaling information to a peer; and
the polling command comprises a polling super field of the radio link control status protocol data unit.

69. The apparatus of claim 68, wherein the polling super field also informs of a sequence number transmitted by the remote transmitter.

70. The apparatus of claim 68, wherein the polling super field also informs of a highest sequence number transmitted by the remote transmitter.

71. The apparatus of claim 67, wherein the radio link control polling protocol data unit is defined as a control channel entry.

72. The apparatus of claim 71, wherein the radio link control polling protocol data unit also informs of a sequence number transmitted by the remote transmitter.

73. The apparatus of claim 71, wherein the radio link control polling protocol data unit also informs of a highest sequence number transmitted by the remote transmitter.

74. The apparatus of claim 67, wherein the receiver is configured to receive protocol data units conforming to High-Speed Packet Access Evolution protocols.

75. The apparatus of claim 67, wherein the receiver is configured to receive protocol data units conforming to Third Generation Partnership Project Long Term Evolution protocols.

76. An apparatus for receiving data from a remote transmitter, comprising:
a memory;
a receiver for receiving a radio link command from the remote transmitter and for receiving a polling command without requiring reception of user-plane data, wherein receiving the polling command comprises receiving a protocol data unit with zero-length data and a header portion of a previously received protocol data unit;
a local transmitter; and
a status component for generating and causing the local transmitter to transmit a status protocol data unit in response to the polling command.

77. The apparatus of claim 76, wherein:
a polling bit of the protocol data unit is set to indicate the polling command.

78. The apparatus of claim 76, wherein a sequence number of the protocol data unit is set to an already transmitted sequence number.

79. The apparatus of claim 76, wherein a sequence number of the protocol data unit is set to a highest transmitted sequence number.

80. The apparatus of claim 76, wherein a sequence number of the protocol data unit is set to a highest transmitted sequence number incremented by one.

81. The apparatus of claim 76, wherein a sequence number of the protocol data unit is set to a next available sequence number.

82. The apparatus of claim 76, wherein a state of a receive buffer is not changed in response to receiving the protocol data unit.

* * * * *